United States Patent [19]
Gagliano et al.

[11] Patent Number: 5,979,824
[45] Date of Patent: *Nov. 9, 1999

[54] STABILIZER FINS-INVERTED FOR AIRCRAFT

[76] Inventors: Christopher Gagliano, 7010 Mark Dr.; Thomas E. Boadman, 4415 Brushy Hill, both of San Antonio, Tex. 78217

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,299

[22] Filed: Apr. 4, 1997

[51] Int. Cl.⁶ .................................................. B64C 9/00
[52] U.S. Cl. ........................... 244/87; 244/13; 244/45 R
[58] Field of Search ......................... 244/87, 13, 45 R; D12/335, 338

[56] References Cited

U.S. PATENT DOCUMENTS

| | | |
|---|---|---|
| D. 113,019 | 1/1939 | Silverstein . |
| D. 115,854 | 7/1939 | Loudy . |
| D. 120,187 | 4/1940 | Silverstein . |
| D. 140,919 | 4/1945 | Sutton . |
| D. 203,283 | 12/1965 | Woods ........................ 244/13 |
| 1,726,558 | 9/1929 | Hall . |
| 2,326,819 | 8/1943 | Berlin . |
| 2,454,981 | 11/1948 | Vint, Jr. . |
| 2,472,763 | 6/1949 | Rodeck . |
| 2,510,561 | 6/1950 | DeLaval . |
| 2,699,299 | 1/1955 | Herrick ..................... 244/45 R |
| 3,017,139 | 1/1962 | Binder ........................ D12/335 |
| 3,018,987 | 11/1962 | Multhopp .................... 244/207 |
| 3,181,820 | 5/1965 | Burnelli . |
| 3,438,597 | 4/1969 | Kasper . |
| 4,025,007 | 5/1977 | Kaniut . |
| 4,343,446 | 8/1982 | Langley . |
| 5,082,204 | 1/1992 | Croston . |

FOREIGN PATENT DOCUMENTS

| | | |
|---|---|---|
| 681209 | 11/1934 | Germany . |
| 190697 | 6/1958 | Germany . |
| 192664 | 4/1959 | Germany . |
| 197933 | 4/1963 | Germany . |
| 98248 | 5/1963 | Germany . |
| 198346 | 6/1963 | Germany . |
| 210809 | 4/1967 | Germany . |
| 221260 | 7/1971 | Germany . |
| 239274 | 3/1975 | Germany . |
| 239522 | 4/1975 | Germany . |
| 273673 | 5/1981 | Germany . |

OTHER PUBLICATIONS

Whitford, Ray. "Design for Combat Aircraft" Jane's Information Group. London. p. 195, 1989.
Design for Flying 1995 David B. Thurston (pp. 112/113).
Dempewolff, Richard "Here Come The . . . " p. 117, Jun. 1954.

*Primary Examiner*—Charles T. Jordan
*Assistant Examiner*—Tien Dinh
*Attorney, Agent, or Firm*—Greenberg Traurig; Robert P. Bell

[57] ABSTRACT

An aircraft of the type having twin booms (14): which connects the main wing (28) with two fin stabilizers (16) and an optional trim stabilizer (22) articulate to change aircraft direction and airspeed.

19 Claims, 3 Drawing Sheets

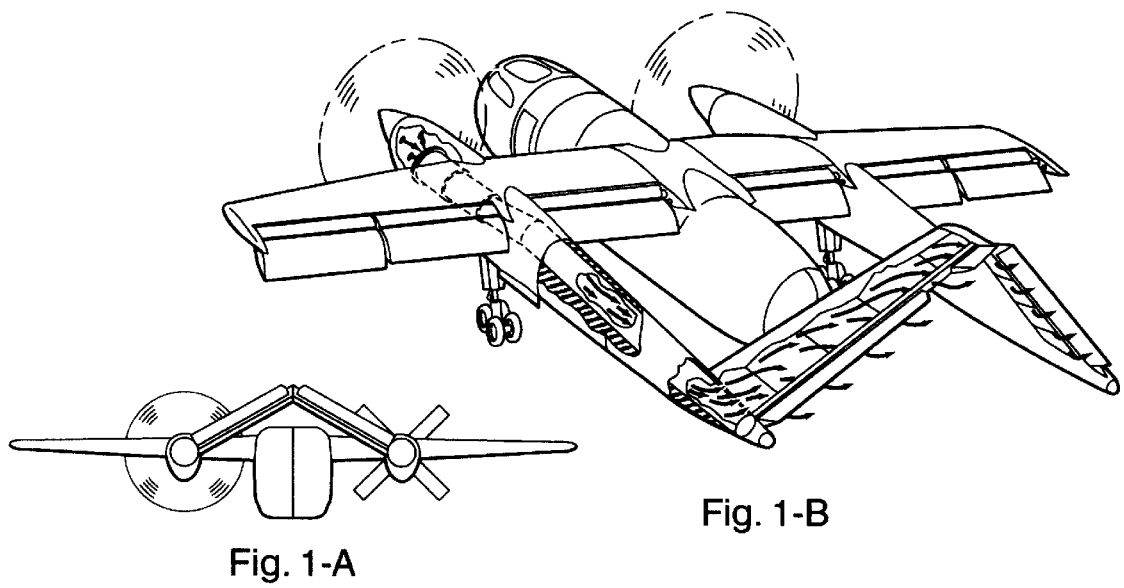
Fig. 1-A
Fig. 1-B
Fig. 2-A
Fig. 2-B

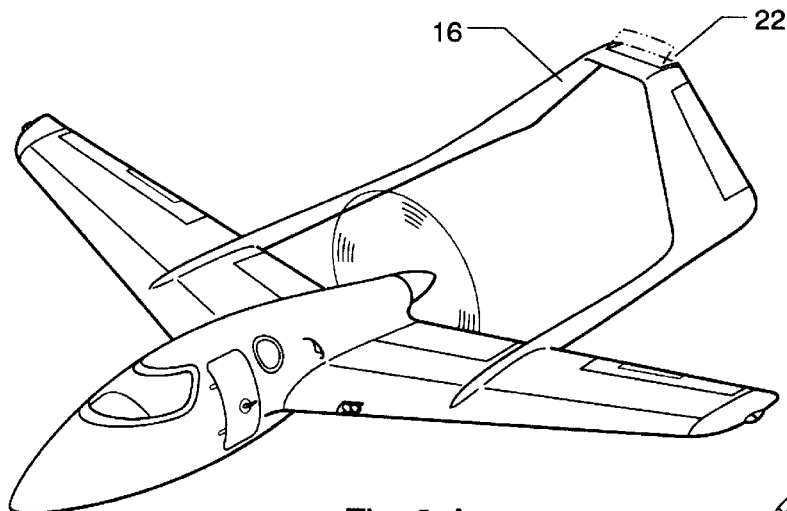
Fig. 3-A
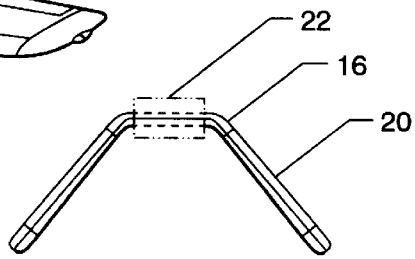
Fig. 3-B
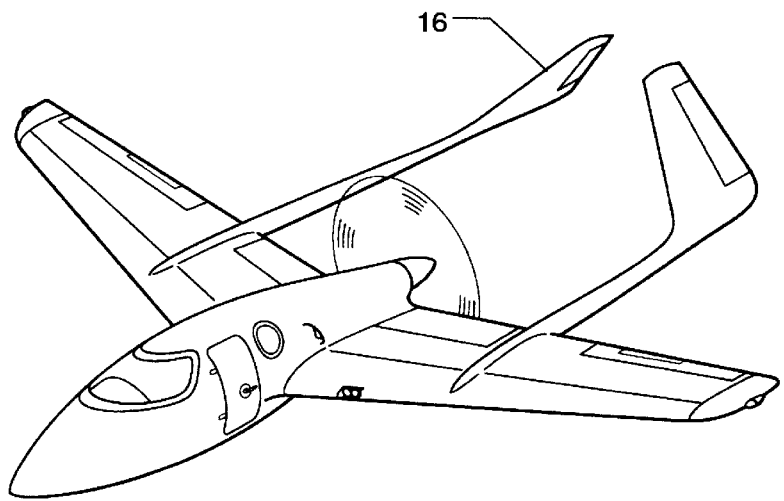
Fig. 4-A
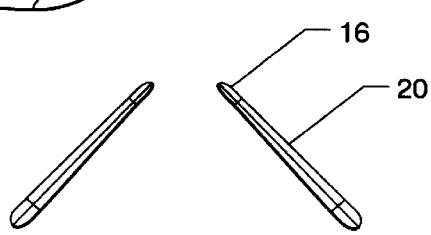
Fig. 4-B

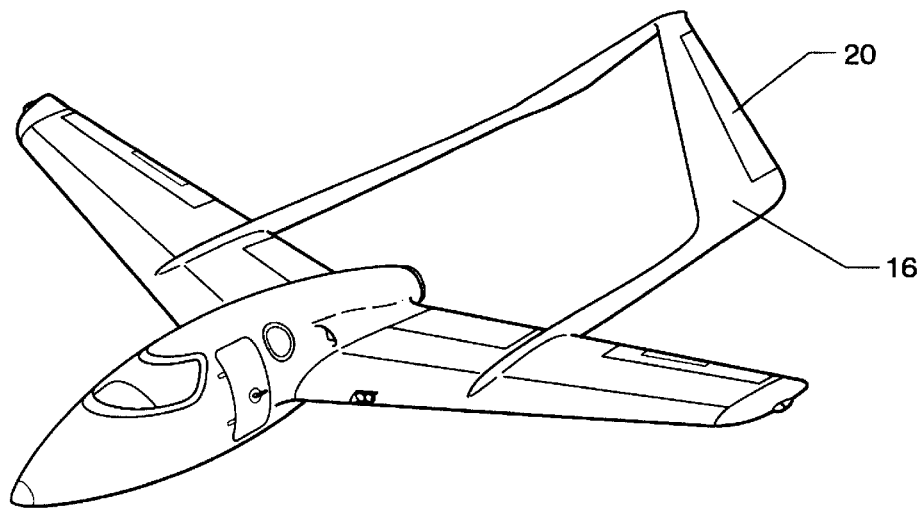
Fig. 5-A
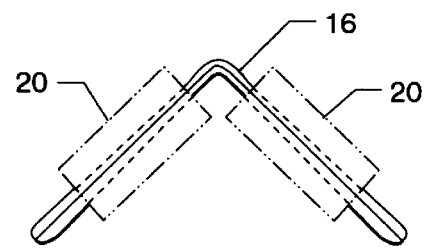
Fig. 5-B
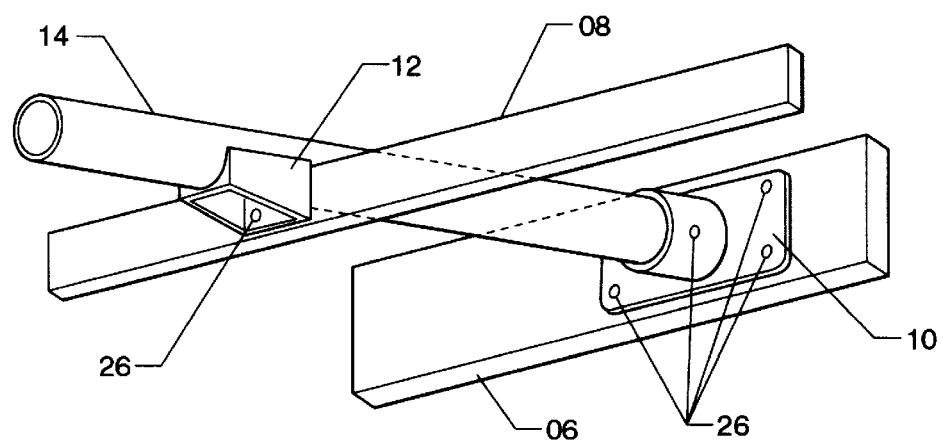
Fig. 6

STABILIZER FINS-INVERTED FOR AIRCRAFT

BACKGROUND

1. Field of the Invention

This invention relates to stabilizing an aircraft in flight, specifically an improved structure over conventional designs.

2. Description of Prior Art

Aircraft have been flown with various tail arrangements since the original Wright Brothers aircraft of 1903.

One type of stabilizer fin (FIG. 1A) known as the inverted "V" has been flown and tested showing evidence of improved performance but the overall concept is ill conceived.

a. Conventional inverted "V" tail presents a basic configuration design problem—providing adequate tail clearance for full stall landings. An overly long and heavy landing gear is the usual solution to this requirement as well as being a reason the conventional inverted "V" tail arrangement is not popular.

b. Conventional inverted "V" tails require heavier tail structures necessary to support the combined horizontal and vertical surfaces at a centralized location.

c. Conventional inverted "V" tails are usually supported by long fuselages that create wasted space and overly costly manufacturing processes.

OBJECTS AND ADVANTAGES

Accordingly, several objects and advantages of our invention are:

a. To provide improved ground clearance while the aircraft is taking off or landing.

b. To provide shorter, lighter landing gear that creates less drag and a lighter structure.

c. To provide stronger landing gear, shorter landing gear create less bending stress during take-off and landing.

d. Aerodynamic and landing loads (stress) can be distributed directly to the main wing structure.

Further objects and advantages are:

a. To provide a structure that can channel engine thrust between the stabilizers which creates less drag, vibration and stress on the airframe b. To provide a structure that because the engine is mounted close to the aircrafts center of gravity no major changes in fuselage length or stabilizer location need take place if a heavy more powerful engine is installed.

c. To provide a structure that has less profile drag due to the smaller diameter aft fuselage making the aircraft more fuel efficient.

d. To provide a structure that has fewer detail parts, reducing the cost of manufacturing.

e. To provide a structure that acts as a propeller guard if the aircraft is built with a pusher type engine installation.

f. To provide a structure that is structurally stronger, allowing the aspect ratio of the stabilizer to be greater than most conventional built aircraft which is a proven method of increasing performance and reducing fuel consumption.

Further objects and advantages of my invention will become apparent from a consideration of drawings and ensuing description.

DESCRIPTION OF DRAWING FIGURES

FIG. 1A shows a conventional inverted "V" tail.

FIG. 1B shows a rear view of conventional inverted "V" tail.

FIG. 2A shows an aircraft utilizing the inverted "V" boom supported stabilizers

FIG. 2B shows a rear view of inverted "V" boom supported stabilizers.

FIG. 3A shows an aircraft utilizing a small optional horizontal stabilizer.

FIG. 3B shows a rear view of inverted "V boom supported stabilizers with small horizontal stabilizer.

FIG. 4A shows an aircraft utilizing the inverted "V" stabilizaion concept but without attachment at the apex of the structure.

FIG. 4B shows a rear view of the inverted "V" boom supported stabilizers without apex attachment.

FIG. 5A shows how airflow stabilizes the aircraft.

FIG. 5B shows how radar waves are deflected away from the aircraft.

FIG. 6 shows one of many ways the stabilizer booms could be attached to the main wing structure.

REFERENCE NUMERALS IN DRAWINGS

06 Main Spar
08 Rear Spar
10 Forward Boom Attach Fitting
12 Aft Boom Attach
14 Boom
16 Fin Stabilizers
18 L/R Fin Attach Point
20 Ruddervators
22 Horizontal Trim Stabilizer
24 Radar Waves
26 Attach Bolts
28 Main Wing

DESCRIPTION OF INVENTION—FIGS. 1A THRU 4B & 6

FIGS. 1A and 1B shows typical prior art of an inverted "V" tail.

FIG. 2A shows a perspective view of a basic version of our inverted "V" tail.

The boom 14 is made from aircraft grade carbon fiber and epoxy available from Aircraft Spruce and Specialty, Fullerton, Calif. However, the boom 14 could be fabricated out of any aircraft grade material as long as the required strength and weight considerations are properly addressed.

Two (2) each booms 14 extend aft approximately three (3) times the length of the mean aerodynamic cord of the wing at which point the fin stabilizers 16 made from aircraft grade fiberglass, foam and epoxy available from Aircraft Spruce and Specialty, Fullerton, Calif. However, the fin stabilizers 16 could be made from any aircraft grade material as long as the required strength and weight considerations are properly addressed. The booms 14 and fins stabilizers 16 may be chemically bonded (epoxy) or mechanically attached with either aircraft grade rivets, bolts or screws.

At the trailing edge of the fin stabilizers 16 and ruddervators 20 (combination rudder and elevator) are mechanically attached to the fin stabilizers 16 with a hinge.

Left and right fin stabilizers 16 are connected at the top of each assembly either by chemically bonding (epoxy) or mechanically attached with either aircraft grade, rivets, bolts or screws.

FIGS. 3A and 3B shows a perspective and rear view of a variation to our inverted "V" tail design. The configuration only differs by adding a small horizontal trim stabilizer 22 atop the angled fin stabilizers 16.

FIG. 4A and 4B shows a perspective and rear view of a variation to our inverted "V" tail design. The configuration differs from FIG. 2A and 2B by eliminating the need to connect the two (2) angled fin stabilizers 16.

FIG. 6 shows a perspective view of one possible method of attaching the stabilizer booms 14 to the main spar 06 and rear spar 08 with a forward attach fitting 10 and an aft attach fitting 12 with bolts 26.

OPERATION OF INVENTION—FIGS. 2B, 5A AND 5B

As shown in FIG. 5A and FIG. 5B, the manner of using the boom supported inverted "V" tail is similar to that of the inverted "V" tail in present use. Namely, air pressure generated by forward thrust flows past the fin stabilizer 16, aerodynamically balancing the aircraft around the center of gravity of said aircraft.

As shown in FIG. 5A and FIG. 5B when a blast of air (generated by either engine thrust or forward motion or a combination of both) passes from the front to the rear of the fin stabilizer 16, a pressure force is equally created all around the fin stabilizer 16. If the nose of the aircraft rotates either; down, up, left or right around the aircraft's center of gravity, the air pressure will become unbalanced, striking the fin stabilizers 16 at an oblique angle thus forcing the fin stabilizers 16 to return to a neutral or balanced equilibrium in relation to original direction of flight.

To intentionally make the aircraft change course, i.e, nose up or down, nose right or left, the pilot must actuate cockpit controls identical to those in present use. Namely rudder and elevator controls which are connected by a mechanical mixer thus the ruddervators 20 (combination rudder elevator) will deflect and unbalance the air pressure around the fin stabilizers 16. This affect will cause the nose to rotate around the aircrafts center of gravity in the direction the pilot wishes to go. Reversing the direction the controls were moved to will stop the rotation and return the aircraft to a neutral or balanced equilibrium.

Additional embodiments are shown in FIG. 2B. In this case, radar (radio detecting and ranging) waves 24 strike the fin stabilizers 16 at an oblique angle reflecting away from the point of emission thus making the aircraft generate a smaller radar signature or possibly eliminating the radar signature altogether.

SUMMARY, RAMIFICATIONS AND SCOPE

Accordingly, the reader will see that the inverted "V" structure is suitable for many aircraft types and different engine configurations. In addition, the structure is most suitable for composite construction but equally adaptable to conventional aluminum construction. Furthermore, the inverted "V" tail has the additional advantage in that:

If the structure is made of suitable strength material, it is not necessary to connect the angled stabilizers at the top thus further reducing the cost of manufacturing. (See FIG. 4A).

If the aircraft requires an adjustable trim tab because the payload may vary fore and aft in the aircraft, a small horizontal trim stabilizer 22 may be added to the structure at the time of manufacture or by the owner operator after delivery. (See FIGS. 3A and 3B).

Various full scale powered aircraft, sailplanes, powered motor gliders, remotely powered research vehicles, or amateur built full scale or model aircraft can utilize our invention.

Since additional propeller ground clearance is obtained with a boom inverted "V" tail, said aircraft could be designed with a conventional tail wheel assembly which is known to be lighter, less expensive to manufacture and creates less drag thus more economical than a fixed or retractable nose landing gear.

If the aircraft suffers a mechanical malfunction requiring the pilot or passenger to bail out, by virtue of the fin stabilizers 16 being separated along the center line of the aircraft, the probability of hitting the tail structure is greatly reduced thus enhancing the chances of a survivable escape. (See FIG. 5A).

Although the description above contains many specificity's, these should not be construed as limiting the scope of the invention but as merely providing illustrations of some of the presently preferred embodiments of the invention.

Thus the scope of the invention should be determined by the appended claims and there legal equivalents rather than by the examples given.

We claim:

1. An improved aircraft having improved stall characteristics, said improved aircraft comprising:
   a fuselage;
   a mechanical engine, located in the fuselage;
   a propeller, mounted to the mechanical engine from a rearward portion of the fuselage, for generating thrust rearward along a longitudinal axis of the fuselage;
   a pair of tailbooms, coupled to the fuselage, extending in a direction rearward from the fuselage;
   at least two inwardly inclined fin stabilizers housing ruddervators, each connected to a corresponding tail boom and inclined toward one another, positioned such that substantially all of the thrust generated by the propeller is channeled between the at least two inwardly inclined ruddervators so as to enhance performance of said at least two inwardly inclined ruddervators to improve stall characteristics of the aircraft.

2. The improved aircraft of claim 1, wherein the at least two inwardly inclined fin stabilizers housing said ruddervators are unconnected from each other.

3. The improved aircraft of claim 1, wherein the at least two inwardly inclined fin stabilizers are connected to each other by means of a fixed brace attached atop of the fin stabilizers housing said ruddervators, said horizontal brace having a trim tab for trimming longitudinal attitude of the aircraft.

4. An aircraft having improved stall characteristics, said aircraft comprising:
   a fuselage;
   a thrust generating means mounted to said fuselage, for generating thrust rearwardly along a longitudinal axis of said fuselage;
   a wing, attached to the fuselage, for providing lift;
   a pair of tail booms extending rearwardly from the wing; and
   a pair of inwardly inclined fin stabilizers housing ruddervators, each mounted on a corresponding tail boom and inclined toward one another such that substantially all of the thrust from thrust generating means is channeled between the pair of inclined fin stabilizers housing said ruddervators,
   wherein channeling of substantially all of the thrust from the thrust generating means between the pair of inclined fin stabilizers reduces drag of said ruddervators while improving stall characteristics of the aircraft.

5. The aircraft of claim 4, wherein the pair of inwardly inclined fin stabilizers housing said ruddervators are unconnected from each other.

6. The aircraft of claim 4, wherein said thrust generating means comprises:
an engine, housed in a rear portion of the fuselage; and
a propeller, coupled to the engine and mounted at the rear portion of the fuselage in a pusher configuration between the pair of tail booms so as to generate thrust between the pair of tail booms such that substantially all of the thrust is channeled between the pair of inwardly canted fin stabilizers housing said ruddervators.

7. An aircraft comprising:
a fuselage;
a thrust generating means mounted to said fuselage, for generating thrust rearwardly along a longitudinal axis of said fuselage;
a wing, attached to the fuselage, for providing lift;
a pair of tail booms extending rearwardly from the wing; and
a pair of inwardly inclined fin stabilizers, each mounted on a corresponding tail boom and inclined toward one another,
wherein the pair of inwardly inclined fin stabilizers housing ruddervators are coupled together at a top portion through a horizontal brace, and a horizontal trim tab for adjusting pitch trim of the aircraft in flight.

8. the aircraft of claim 4, wherein the horizontal trim tab adjusts pitch trim of the aircraft in flight.

9. An improved tail section for a aircraft providing improved stall characteristics for the aircraft, the aircraft including a fuselage, a wing, and a thrust generating means mounted to the central fuselage for generating thrust rearwardly along a longitudinal axis of said fuselage, said improved tail section comprising:
a pair of tail booms, coupled to the wing and extending rearwardly; and
a pair of inwardly inclined fin stabilizers housing ruddervators, each mounted on a corresponding tail boom and inclined toward one another such that substantially all thrust from thrust generating means is channeled between the pair of inclined ruddervators so as to enhance performance of said at least two inwardly inclined ruddervators to improve stall characteristics of the aircraft.

10. The improved tail section of claim 9, wherein the pair of inwardly inclined fin stabilizers housing ruddervators are unconnected from each other.

11. The improved tail section of claim 9, wherein the pair of inwardly inclined fin stabilizers housing ruddervators are coupled together at a top portion.

12. The improved tail section of claim 11 wherein the pair of inwardly inclined fin stabilizers housing ruddervators are coupled together at the top portion through a horizontal brace.

13. The improved tail section of claim 12, wherein the horizontal brace comprises a pitch trim tab for adjusting pitch trim of the aircraft in flight.

14. An improved airplane, having improved stall characteristics, said improved airplane comprising:
a substantially teardrop-shaped fuselage section comprising a forward cockpit portion and a rear engine compartment portion;
an engine, housed in the engine compartment portion of the substantially teardrop-shaped fuselage section;
a propeller, coupled to the engine and mounted at the rear engine compartment portion of the substantially teardrop-shaped fuselage section in a pusher configuration;
a wing, mounted to a middle portion of the substantially teardrop-shaped fuselage section, said wing comprising a first portion and a second portion, the first portion extending outwardly from a first side of the substantially teardrop-shaped fuselage section, the second portion extending outwardly from a second side of the substantially teardrop-shaped fuselage section;
a pair of tail booms, each connected to a respective one of the first and second portions of the wing and extending aft from the wing;
a pair of inwardly inclined fin stabilizers housing ruddervators, each attached to a rear portion of a corresponding one of the pair of tail booms, the pair of inwardly inclined ruddervators positioned such that substantially all of the thrust from the propeller passes between and is channeled by the pair of inwardly inclined ruddervators so as to enhance performance of said at least two inwardly inclined ruddervators to improve stall characteristics of the airplane.

15. The improved airplane of claim 14, wherein the pair of inwardly inclined fin stabilizers housing ruddervators are unconnected from each other.

16. The improved aircraft of claim 14, wherein the pair of inwardly inclined fin stabilizers housing ruddervators are coupled together at a top portion.

17. The improved aircraft of claim 16 wherein the pair of inwardly inclined fin stabilizers housing ruddervators are coupled together at the top portion through a horizontal brace.

18. The improved aircraft of claim 17, wherein the horizontal brace comprises a pitch trim tab for adjusting horizontal trim of the aircraft in flight.

19. An airplane, comprising:
a substantially teardrop-shaped fuselage section comprising a forward cockpit portion and a rear engine compartment portion;
a thrust generating engine, housed in the engine compartment portion of the substantially teardrop-shaped fuselage section for generating thrust rearward from the substantially teardrop shaped fuselage section;
a wing, mounted to a middle portion of the substantially teardrop-shaped fuselage section, said wing comprising a first portion and a second portion, the first portion extending outwardly from a first side of the substantially teardrop-shaped fuselage section, the second portion extending outwardly from a second side of the substantially teardrop-shaped fuselage section;
a pair of tail booms, each connected to a respective one of the first and second portions of the wing and extending aft from the wing;
a pair of inwardly inclined fin stabilizers housing ruddervators, each attached to a rear portion of a corresponding one of the pair of tail booms, the pair of inwardly inclined fin stabilizers housing ruddervators positioned such that substantially all of the thrust from the thrust generating engine passes between and is channeled by the pair of inwardly inclined fin stabilizers housing ruddervators so as to enhance performance of said at least two inwardly inclined fin stabilizers housing ruddervators to improve stall characteristics of the aircraft.

* * * * *